(12) United States Patent
Sheehan

(10) Patent No.: US 6,848,266 B1
(45) Date of Patent: Feb. 1, 2005

(54) CONTROL OF HVAC SYSTEM

(75) Inventor: Darren S. Sheehan, West Hartford, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/725,868

(22) Filed: Dec. 2, 2003

(51) Int. Cl.$^7$ ............................................. F25D 23/00
(52) U.S. Cl. ......................................... 62/264; 62/249
(58) Field of Search ................... 62/264, 249; 422/108, 422/119, 121

(56) References Cited

U.S. PATENT DOCUMENTS

| | | | |
|---|---|---|---|
| 5,203,989 A | * | 4/1993 | Reidy .......................... 210/137 |
| 5,601,786 A | * | 2/1997 | Monagan .................... 422/108 |
| 6,171,548 B1 | * | 1/2001 | Rose et al. .................... 422/20 |
| 2002/0008214 A1 | * | 1/2002 | Sevack et al. .......... 250/504 R |
| 2003/0021720 A1 | | 1/2003 | Reisfeld et al. |

* cited by examiner

Primary Examiner—Melvin Jones
(74) Attorney, Agent, or Firm—Carlson, Gaskey & Olds, PC

(57) ABSTRACT

An ultraviolet photocatalytic oxidation device includes at least one first ultraviolet light source and at least one second ultraviolet light source. The ultraviolet light sources are all switched off when a fan for the HVAC system is switched off. In another feature of the present invention, while the evaporator coil is on, all of the ultraviolet light sources are turned on. Because the ultraviolet light sources are more effective when the evaporator coil is off, some of the ultraviolet light sources are turned off while the evaporator coil is off. While the evaporator coil is off, the ultraviolet light sources may be switched on alternately, such that they are on each on a substantially equal portion of the time that the evaporator coil is off.

20 Claims, 1 Drawing Sheet

CONTROL OF HVAC SYSTEM

BACKGROUND OF THE INVENTION

The present invention relates generally to indoor air-quality systems and more particularly to the operation of indoor air-quality systems with ultraviolet light sources.

Some known indoor air-quality systems include ultraviolet photocatalytic oxidation devices which remove gases such as volatile organic compounds from the air in heating ventilation and air-conditioning systems. These devices include ultraviolet light sources that direct ultraviolet light onto a photocatalyst on a substrate. The ultraviolet light sources must be replaced periodically, thus increasing the cost of maintaining the device. The more that the ultraviolet light sources are on, the more frequently they will have to be replaced.

In some installations, the ultraviolet light sources must be downstream of the air-conditioning evaporator coil. When the evaporator coil is activated, the air downstream is cold. Ultraviolet light sources are less effective when cold, so additional ultraviolet light sources are sometimes required when they are installed downstream of the evaporator coil.

SUMMARY OF THE INVENTION

The present invention provides an indoor-air quality system that improves the life of the ultraviolet light sources without any reduction in their effectiveness.

In the present invention, the ultraviolet photocatalytic oxidation device includes at least one first ultraviolet light source and at least one second ultraviolet light source. First, the ultraviolet light sources are all switched off when a fan for the HVAC system is switched off. When the fan is off, the photocatalytic oxidation device is unnecessary. Therefore, by turning it off when the fan is off, the life of the ultraviolet light sources is extended. This savings in the life of the ultraviolet light sources is inexpensive to implement, requiring no additional sensors.

The present invention also discloses another feature for extending the life of the ultraviolet light sources when the ultraviolet light sources are installed downstream of the air-conditioner evaporator coil. While the evaporator coil is on, all of the ultraviolet light sources are turned on. Because the ultraviolet light sources are more effective when the evaporator coil is off, some of the ultraviolet light sources are turned off while the evaporator coil is off. While the evaporator coil is off, the ultraviolet light sources may be switched on alternately, such that they are on each on a substantially equal portion of the time that the evaporator coil is off. Therefore, the life of each of the ultraviolet light sources is increased.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
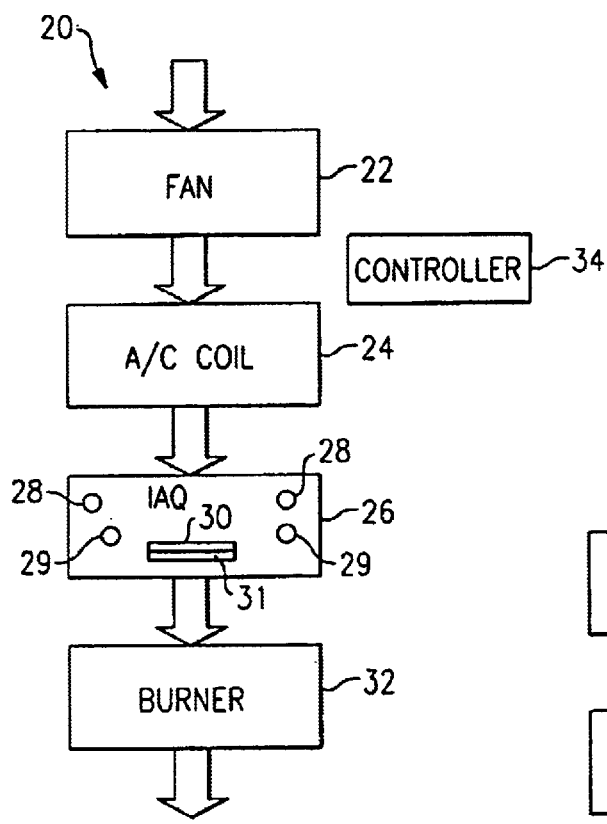
FIG. 1 is a schematic of a first embodiment of an HVAC system according to the present invention.

A heating, ventilation and air-conditioning (HVAC) system 20 according to a first embodiment of the present invention is shown in FIG. 1. The HVAC system 20 includes a system fan 22 forcing air through the system. Downstream of the fan 22 is an air-conditioner evaporator coil 24. The fan 22 and evaporator coil 24 are of any generally known types.

An indoor air-quality system 26 includes a plurality of first ultraviolet light sources 28 and a plurality of second ultraviolet light sources 29. In the embodiment described, the indoor air-quality system 26 is an ultraviolet photocatalytic oxidation device 26 where the ultraviolet light sources 28, 29 direct ultraviolet light onto a photocatalyst 30 on a substrate 31. The ultraviolet photocatalytic oxidation device 26 remove gases such as volatile organic compounds from the air in the system 20.

The system 20 may or may not further include a burner 32 for a furnace as part of the system 20. In the first embodiment, the burner 32 is downstream of the fan 22, evaporator coil 24 and indoor air-quality system 26.

The system 20 may further include a controller 34, which may be a computer with a suitably programmed microprocessor, memory, etc. The controller 34 may control the operation of the entire system 20, such as temperature and humidity control, in addition to the functions described herein.

In operation, the controller 34 controls the fan 22, evaporator coil 24 and burner 32 in any known manner. Additionally, the controller 34 switches off the first and second ultraviolet light sources 28, 29 whenever the fan 22 is off. When the fan 22 is on (according to the normal control algorithms of the controller 34), the controller 34 switches on at least some of the ultraviolet light sources 28, 29 based upon the fan 22 being on.

According to another feature of the present invention, when the fan 22 is on but the air-conditioner evaporator coil 24 is off, the controller 34 alternates between: a) switching on the first ultraviolet light sources 28 while keeping the second ultraviolet light sources 29 off and b) switching on the second ultraviolet light sources 29 while turning off the first ultraviolet light sources 28. In this manner, the lives of the ultraviolet light sources 28, 29 are extended, since they are each on only half the time that the fan 22 is on and the evaporator coil 24 is off.

When the evaporator coil 24 is on, the air passing through the indoor air-quality system 26 is cooler, reducing the effectiveness of the ultraviolet light sources 28, 29. Therefore, when the evaporator coil 24 is on and the fan 22 is on, all of the ultraviolet light sources 28, 29 are turned on by the controller 34. This provides full effectiveness of the indoor air-quality system 26 even when cool air is passing through the system 26.

When the fan 22 is off (the coil 24 would also be off), all of the ultraviolet light sources 28, 29 are turned off by the controller 34. This further extends the lives of all of the ultraviolet light sources 28, 29.

Figure 2:
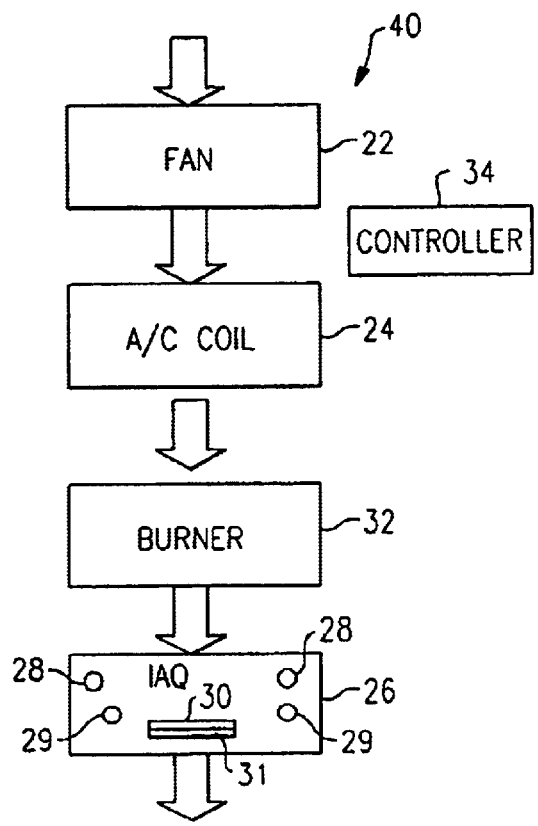
FIG. 2 is a schematic of a second embodiment of an HVAC system according to the present invention.

A second embodiment of an HVAC system 40 according to the invention is shown in FIG. 2. Generally, the components are the same as those described above. However, the order of the components has changed. In the second embodiment, the indoor air-quality system 26 is installed downstream of the fan 22, evaporator coil 24 and burner 32. The controller 34 and the operation of the components by the controller 34 are identical to that described above with respect to FIG. 1.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An indoor air-quality system comprising:
   an ultraviolet photocatalytic oxidation device having at least one ultraviolet light source; and
   a switch turning the at least one ultraviolet light source on and off, the switch turning the at least one ultraviolet light source on based upon whether at least one HVAC component is on and the switch turning the at least one ultraviolet light source off based upon whether the at least one HVAC component is off.

2. The system of claim 1 wherein the HVAC component is a fan and wherein the switch turns off the at least one ultraviolet light source bred upon the fan being off, and wherein the switch turns on the at least one ultraviolet light source based upon the fan being on.

3. The system of claim 1 wherein the HVAC component is an evaporator coil and wherein the switch turns off the at least one ultraviolet light source based upon the evaporator coil being off, and wherein the switch turns on the at least one ultraviolet light source based upon the evaporator coil being on.

4. The system of claim 3 wherein the at least one ultraviolet light source includes a first ultraviolet light source and wherein the system further includes a second ultraviolet light source, and wherein the switch turns off the first ultraviolet light source based upon the evaporator coil being off, wherein the switch turns on the first ultraviolet light source based upon the evaporator coil being on, and wherein the second ultraviolet light source is on at least sometimes while the evaporator coil is off.

5. The system of claim 4 wherein the second ultraviolet light source is switched on based upon the evaporator coil being on.

6. A method for controlling an ultraviolet light source in an air-quality system including the steps of:
   a) switching an ultraviolet light source based upon whether at least one HVAC component is on; and
   b) switching the ultraviolet light source off based upon whether the at least one HVAC component is off,
   wherein the HVAC component is an evaporator coil and wherein said step a) further includes the step of turning on the ultraviolet light source based upon the evaporator coil being on, and wherein said step b) further includes the step of turning off the ultraviolet light source based upon the evaporator coil being off.

7. The method of claim 6 wherein the HVAC component is a fan and wherein said step a) further includes the step of turning on the ultraviolet light source based upon the fan being on, and wherein said step b) further includes the step of turning off the ultraviolet light source based upon the fan being off.

8. The method of claim 6 wherein the HVAC component is an evaporator coil and wherein said step a) further includes the step of turning on the ultraviolet light source based upon the evaporator coil being on, and wherein said step b) further includes the step of turning off the ultraviolet light source based upon the evaporator coil being off.

9. The method of claim 6 wherein the ultraviolet light source is a first ultraviolet light source, the method further including the step of powering a second ultraviolet light source while the evaporator coil is off.

10. The method of claim 9 further including the step of powering the second ultraviolet light while the evaporator coil is on and while the first ultraviolet light source is on.

11. An indoor air-quality system comprising:
    at least one ultraviolet light source; and
    a switch turning the at least one ultraviolet light source on and off, the switch turning the at least one ultraviolet light source on based upon whether at least one HVAC component is on and the switch tuning the at least one ultraviolet light source off based upon whether the at least one HVAC component is off, wherein the HVAC component is a fan and wherein the switch turns off the at least one ultraviolet light source based upon the fan being off, and wherein the switch turns on the at least one ultraviolet light source based upon the fan being on.

12. The system of claim 11 wherein the at least one ultraviolet light source is part of an ultraviolet photocatalytic oxidation device.

13. An indoor air-quality system comprising:
    at least one ultraviolet light source; and
    a switch turning the at least one ultraviolet light source on and off, the switch turning the at least one ultraviolet light source on based upon whether at least one HVAC component is on and the switch turning the at least one ultraviolet light source off bated upon whether the at least one HVAC component is off, wherein the HVAC component is an evaporator coil and wherein the switch turns off the at least one ultraviolet tight source based upon the evaporator coil being off, and wherein the switch turns on the at least one ultraviolet light source based upon the evaporator coil being on.

14. The system of claim 13 wherein the at least one ultraviolet light source includes a first ultraviolet light source and wherein the system further includes a second ultraviolet light source and wherein the switch turns off the first ultraviolet light source based upon the evaporator coil being off, wherein the switch turns on the first ultraviolet light source based upon the evaporator coil being on, and wherein the second ultraviolet light source is on at least sometimes while the evaporator coil is off.

15. The system of claim 14 wherein the second ultraviolet light source is switched on based upon the evaporator coil being on.

16. The system of claim 15 wherein the at least one ultraviolet light source is part of an ultraviolet photocatalytic oxidation device.

17. The system of claim 13, wherein the at least one ultraviolet light source is part of an ultraviolet photocatalytic oxidation device.

18. A method for controlling an ultraviolet light source in an air-quality system including the steps of:
    a) switching an ultraviolet light source based upon whether at least one HVAC component is on; and
    b) switching the ultraviolet light source off based upon whether the at least one HVAC component is off,
    wherein the HVAC component is a fan and wherein said step a) further includes the step of turning on the ultraviolet light source based upon the fan being on, and wherein said step b) further includes the step of turning off the ultraviolet light source based upon the fan being off.

19. The method of claim 18 wherein the ultraviolet light source is part of an ultraviolet photocatalytic oxidation device.

20. The method of claim 6 wherein the ultraviolet light source is part of an ultraviolet photocatalytic oxidation device.

* * * * *

UNITED STATES PATENT AND TRADEMARK OFFICE
CERTIFICATE OF CORRECTION

PATENT NO. : 6,848,266 B1
DATED : February 1, 2005
INVENTOR(S) : Sheenhan

It is certified that error appears in the above-identified patent and that said Letters Patent is hereby corrected as shown below:

Column 3,
Line 15, "bred" should read as -- based --.

Column 4,
Line 6, "tuning" should read as -- turning --.
Line 23, "bated" should read as -- based --.
Line 26, "tight" should read as -- light --.

Signed and Sealed this

Twenty-sixth Day of April, 2005

JON W. DUDAS
*Director of the United States Patent and Trademark Office*